United States Patent
Schaude

(10) Patent No.: US 10,402,243 B2
(45) Date of Patent: Sep. 3, 2019

(54) INPUT ANALYSIS FOR DYNAMIC DATA OBJECT DEFINITIONS

(71) Applicant: SAP SE, Walldorf (DE)

(72) Inventor: Horst Schaude, Kraichtal (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 15/830,250

(22) Filed: Dec. 4, 2017

(65) Prior Publication Data
US 2019/0171503 A1 Jun. 6, 2019

(51) Int. Cl.
*G06F 9/54* (2006.01)
*G06F 3/0482* (2013.01)
*G06F 17/28* (2006.01)
*H04L 29/08* (2006.01)

(52) U.S. Cl.
CPC ............ *G06F 9/547* (2013.01); *G06F 3/0482* (2013.01); *G06F 17/28* (2013.01); *H04L 67/02* (2013.01)

(58) Field of Classification Search
None
See application file for complete search history.

(56) References Cited

U.S. PATENT DOCUMENTS

| | | | |
|---|---|---|---|
| 7,703,026 B2 | 4/2010 | Bechtold et al. | |
| 8,195,609 B2 | 6/2012 | Bruss et al. | |
| 8,205,195 B2 | 6/2012 | Wagner et al. | |
| 8,225,303 B2 | 7/2012 | Wagner et al. | |
| 8,407,222 B2 | 3/2013 | Morsch et al. | |
| 8,438,119 B2 | 5/2013 | Puteick et al. | |
| 8,893,078 B2 | 11/2014 | Schaude et al. | |
| 9,063,753 B2 | 6/2015 | Schaude | |
| 2003/0144831 A1* | 3/2003 | Ford | |
| 2008/0154619 A1 | 6/2008 | Bruss et al. | |
| 2009/0144721 A1 | 6/2009 | Wagner et al. | |
| 2010/0082497 A1 | 4/2010 | Biesemann et al. | |
| 2011/0307348 A1 | 12/2011 | Vasing et al. | |
| 2012/0047079 A1 | 2/2012 | Biesemann et al. | |
| 2012/0254143 A1* | 10/2012 | Varma | |
| 2013/0144742 A1 | 6/2013 | Thakur et al. | |
| 2014/0013440 A1 | 1/2014 | Thakur et al. | |

* cited by examiner

*Primary Examiner* — Syed A Roni
(74) *Attorney, Agent, or Firm* — Fish & Richardson P.C.

(57) ABSTRACT

Techniques are described for generically providing a solution to developers in supporting web service input calls to systems with dynamic definitions. An example method includes obtaining, from a repository, a list of code value and code description pairs associated with the particular data type. The obtained list is searched for a particular code description matching the string value of the identified input. In response to identifying a particular code description exactly matching the string value of the identified input, the string value of the identified input is associated to the particular code value corresponding to the particular code description. The particular backend application is then executed based on the particular code value associated with the string value of the identified input.

17 Claims, 3 Drawing Sheets

305 → All Supported Code Values and Descriptions:

```
var allCountryValAndDescr = CountryCode.GetAllValuesAndDescriptions();
```

310 → Context Dependent Values and Descriptions:

```
var allRegionValAndDescr = this.RegionCode.GetAllValuesAndDescriptions( this.RegionCode.listID );
```

315 → Matching Variable:

```
var match = allCountryValAndDescr.Collection.where( anyValue => anyValue.Value == newData.CountryCode );
```

320 → Loop Over Values for Providing Possible Values to End User:

```
foreach ( var myCode in allCountryValAndDescr.Collection ) {
    var myDescription = myCode.Description;
    var myCountryCode = myCode.Value;
}
```

325 → Changing Languages from External Data Source to Internal Data Source Language:

```
var allCountryValAndDescrLangu = this.CountryCode.GetAllValuesAndDescriptionsInOtherLanguage(myLangu);
var allRegionValAndDescrLangu =
this.RegionCode.GetAllValuesAndDescriptionsInOtherLanguage(LanguageCode.ParseFromString("DE")),
this.RegionCode.listID );
```

FIG. 3

INPUT ANALYSIS FOR DYNAMIC DATA
OBJECT DEFINITIONS

BACKGROUND

The present disclosure relates to a system and computerized method for generically providing a solution to developers in supporting web service input calls to systems with dynamic definitions.

Many software systems and their data objects have or are defined by metadata, especially for Web Service APIs (application programming interfaces). The backend data model structure for such systems and objects may be subject to various changes from time to time or on a regular basis. In order for current applications and web services to access the available data correctly, the metadata associated with the systems and the particular objects generally must be updated in a timely and regular fashion to allow users and applications to correctly access and interact with the system's data structure and data values. In many instances, the dynamic nature of a backend system makes such changes difficult, time-consuming, and in some cases, impossible.

SUMMARY

Implementations of the present disclosure are generally directed to generically providing a solution to developers in supporting web service input calls to systems with dynamic definitions. In one example implementation, a computerized method executed by hardware processors can be performed. The example method can comprise obtaining, from a repository, a list of code value and code description pairs associated with the particular data type. The obtained list is searched for a particular code description matching the string value of the identified input. In response to identifying a particular code description exactly matching the string value of the identified input, the string value of the identified input is associated to the particular code value corresponding to the particular code description. The particular backend application is then executed based on the particular code value associated with the string value of the identified input.

Implementations can optionally include one or more of the following features. In some instances, the method can further comprise, in response to identifying two or more code descriptions from the obtained list of code values and code description pairs partially matching the string value of the identified input: providing contextual help for presentation to the external web service where the contextual help identifies each of the code descriptions associated with the two of more code descriptions from the obtained list of code value and code description pairs. A second input received from the external web service associated with a particular one of the two or more code descriptions can be identified. The string value of the identified input can then be associated to the particular code value corresponding to the particular one of the two or more code descriptions.

In some instances, searching the obtained list of code values and code description pairs for the particular code description matching the string value of the identified input can include executing a regular expression to identify at least one code description from the obtained list of code value and code description pairs matching the identified input.

In some instances, the input received from the external web service can comprise user input entered into a text box, and wherein the text box is associated with a particular data type.

In some instances, the input received from the external web service is associated with a predefined context, wherein the predefined context is used to identify a subset of the list of code value and code description pairs associated with the particular data type. In those instances, obtaining the list of code value and code description pairs associated with the particular data type can comprise obtaining a list of code value and code description pairs associated with the particular data type and corresponding to the predefined context.

In some instances, the list of code value and code description pairs associated with the particular data type can be extended from an initially defined list to include at least one code value and code description pair not available at a time the external web service was created.

In some instances, the list of code value and code description pairs are associated with a set of allowed inputs associated with the backend application, wherein changes to the set of allowed inputs associated with the backend application are not provided to the external web service.

In some instances, each code description comprises a natural language description of the input represented by the corresponding code value. In other instances, the code value and code description pairs are associated with business object data.

Similar operations and processes may be performed in a system comprising at least one process and a memory communicatively coupled to the at least one processor where the memory stores instructions that when executed cause the at least one processor to perform the operations. Further, a non-transitory computer-readable medium storing instructions which, when executed, cause at least one processor to perform the operations may also be contemplated. In other words, while generally described as computer implemented software embodied on tangible, non-transitory media that processes and transforms the respective data, some or all of the aspects may be computer implemented methods or further included in respective systems or other devices for performing this described functionality. The details of these and other aspects and embodiments of the present disclosure are set forth in the accompanying drawings and the description below. Other features, objects, and advantages of the disclosure will be apparent from the description and drawings, and from the claims.

DESCRIPTION OF DRAWINGS

FIG. 3 is an example illustration of several potential pseudocode-based operations performed in one implementation of the present disclosure.

DETAILED DESCRIPTION

Figure 1:
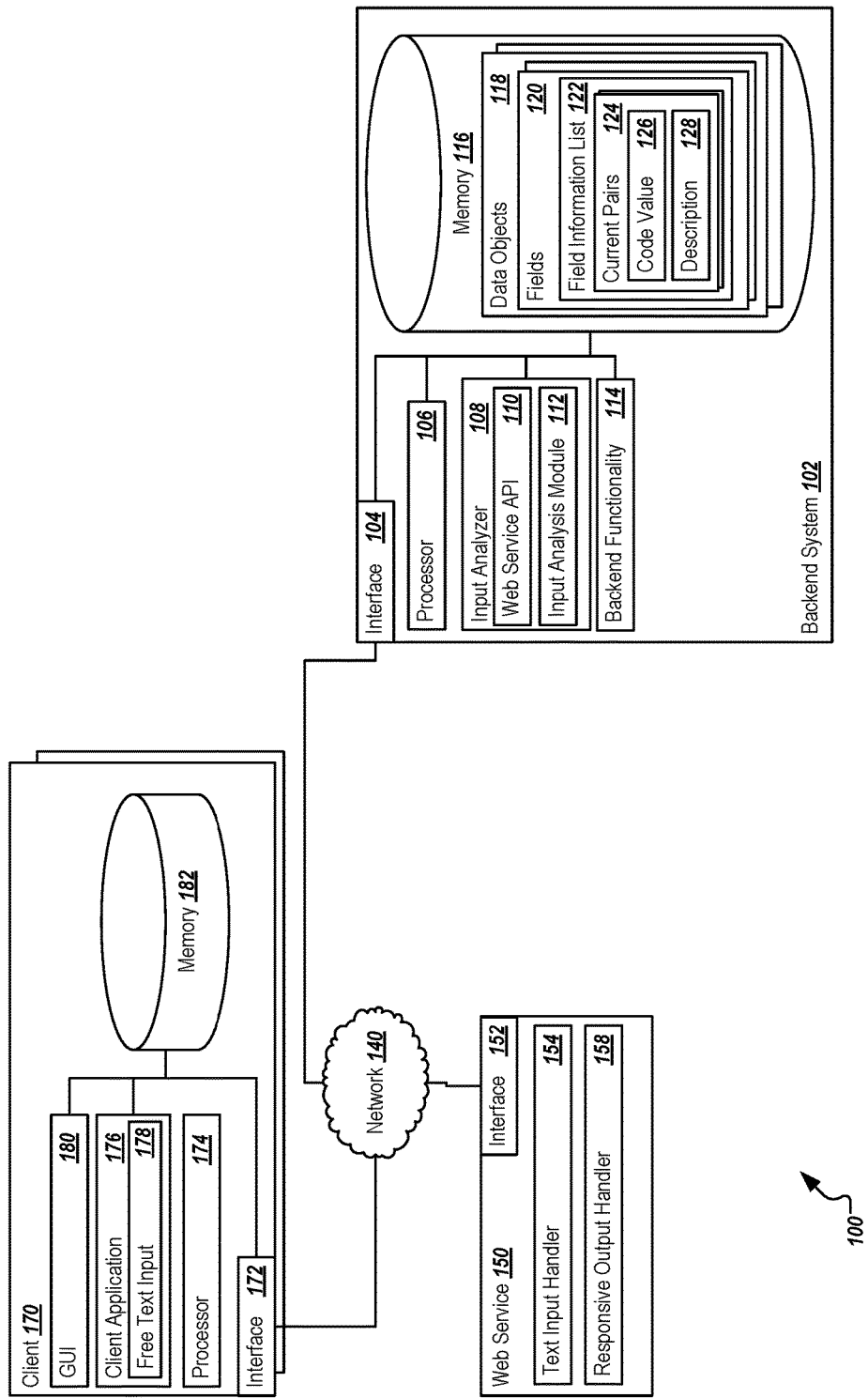
FIG. 1 is a block diagram illustrating an example system for implementing a generic solution for associated web service input to particular data object requirements.

The present disclosure describes systems and methods for implementing a generic solution for associated web service input to particular data object requirements. In some instances, a software provider or ecosystem developer may provide an infrastructure to allow customers to enhance solutions through a partner development system, such as SAP's Partner Development Infrastructure (PDI). In doing so, services and functionality can be defined by third parties to incorporate or build upon the original applications and functionality provided by the developer and development team. As is the case with software products, portions of the product may be subject to regular updates, such as through actions performed on data objects of the backend system through interactions with web services, XML file uploads, and other external sources. Those web services, XML file uploads, and other external sources may be used to interact with a backend model or data objects. In such instances, any new or updated data provided by those systems can be updated, and information received from the web services, XML file uploads, and other external sources may need to be verified to confirm that the new data is valid against the backend data objects.

In particular, backend systems and particular data objects (e.g., business objects) may include fields with a predefined (but changing) set of values for particular data types or fields. For example, a code description and code values for a field "Occupation" may be updated and/or differ as new or additional options are added. In the "Occupation" example, a code description of "Student" may be associated with a code value of "1", a code description of "Professional" may be associated with a code value of "2", a code description of "Entrepreneur" may be associated with a code value of "3", and a code description of "Unemployed" may be associated with a code value of "4". The code descriptions may be any descriptive string used to provide a natural language meaning or definition to a particular code value, where the code value is used by the backend system and its functionality for specifically identifying the value. In many cases, the code description may be used to identify (e.g., to users) what a particular code value stands or represents. The code list pairs (i.e., the code values and their corresponding code descriptions) can be a defined list of values associated with or defining particular available values for an element or field associated with a data object.

The code values associated with particular code descriptions may change over time based on software developments or changes, particular code descriptions may be changed while remaining associated with the same code value, and/or additional code value and code description pairs will be added to identify or address new or expanded needs within the software. As the customer or those extending the base solution may not have direct access to a data type definition based on the programming model, he or she must predict the possible code descriptions and/or code values in the future in addition to those at design time to avoid any issues when converting the data into the appropriate format for the underlying data object. In the case of code values, the check for whether a new value is supported by the current definition of the code data type is not available, as there is no mechanism to read all supported code values from the backend side. Therefore, normally there is a set of allowed values defined against which the new value is checked. However, this process can be cumbersome as the runtime requirements are increased and the process is delayed in operation, as well as efforts to adapt the cloud or extended solution to determine if new values will be supported or whether existing values have been changed. For the purposes of code descriptions, the effort is even more complicated as the mapping of the description must also include the use of several potential languages, in some cases.

The present solution provides a generic mechanism for validating values associated with a particular data type or data object field without requiring specific pre-knowledge of the allowed code descriptions and code values associated with a particular item. In some instances, an initial set of options may be available to users or applications (e.g., selectable in a list), but any changes to the allowed code descriptions and code values may change before the list is updated. In other instances, inputs may be received as a free text entry or submission and can be used by comparing the identified input to available code descriptions. In response to identifying an exact match, the code description can be validated and the input can be associated with a particular corresponding code value at the backend system. Any operations associated with the identified input can then be performed using the determined code value. In some instances, the identified input can be modified to match the appropriate code description, or the input can be associated with the code value in addition to the defined standard code description.

Code values and code descriptions may be used to identify any particular input. Example code value and code description pairs may include country codes, unit codes, currency codes, seasonal or month information, inventory items, business data, units of measurements, organizations or groups, or any other suitable information. In some instances, the identified inputs used to determine a corresponding code value may be initially linked to a particular data type. For example, the input or the source of the input may indicate or be associated with a particular data type or context of data. For example, a particular client application or web service from which the input is received may be associated with or may provide information providing a context to the input. In doing so, a particular data object or data object field can be identified. Using that information, a list of code values and descriptions associated with the particular data type or data context can be obtained. At that point, a matching algorithm can be used to determine whether one or more of the code descriptions associated with that data type and/or data context correspond to the identified input. If a particular code description matches the input exactly, the code value associated with the matching code description from the obtained list can be used as the code value associated with the identified input. If more than one code description represents a potential match, such as based on the identified input including a portion of two or more code descriptions, an interactive or responsive set of help values may be provided back to the input source. A second input identifying one of the provided potential code description matches can be identified, and the code value associated with the code description selected by the second input can be associated with the initial input value. If no potential matches are returned or identified, an error message can be returned to the requesting system.

Turning to the illustrated implementation, FIG. 1 is a block diagram illustrating an example system 100 for implementing a generic solution for associated web service input to particular data object requirements. As illustrated in FIG. 1, system 100 is associated with a cloud-based system for allowing generic access and validation of inputs in connection with one or more data objects, and can allow the illustrated components to share and communicate information across devices and systems (e.g., backend system 102, web service 150, and client 170, among others, via network 140). In some instances, both the web service 150 and the backend system 102 may be cloud-based components or solutions, while in others, non-cloud systems may be used, particularly for the backend system 102. In some instances, non-cloud-based systems, such as on-premise systems, may use or adapt the processes described herein. Although components are shown individually, in some implementations, functionality of two or more components, systems, or servers may be provided by a single component, system, or server.

As used in the present disclosure, the term "computer" is intended to encompass any suitable processing device. For example, backend system 102 and client 170 may be any computer or processing device such as, for example, a blade server, general-purpose personal computer (PC), Mac®, workstation, UNIX-based workstation, or any other suitable device. Moreover, although FIG. 1 illustrates a single backend system 102, the system 100 can be implemented using a single system or more than those illustrated, as well as computers other than servers, including a server pool. In other words, the present disclosure contemplates computers other than general purpose computers, as well as computers without conventional operating systems. Similarly, the client 170 may be any system which can request data and/or interact with the backend system 102 and/or the web service 150. The client device 170, in some instances, may be a desktop system, a client terminal, or any other suitable device, including a mobile device, such as a smartphone, tablet, smartwatch, or any other mobile computing device. In general, each illustrated component may be adapted to execute any suitable operating system, including Linux, UNIX, Windows, Mac OS®, Java™, Android™, Windows Phone OS, or iOS™, among others.

The backend system 102 may be associated with the execution of one or more business operations. In some instances, the backend system 102 may be associated with an end-to-end business solution system, enterprise resource planning (ERP) systems, customer resource management (CRM) systems, business intelligence systems, cloud platform systems, supplier management (SM) systems, or any other suitable system, including non-business-related systems. In general, the backend system 102 executes a set of backend functionality 114 related to the underlying operations of the system. To perform these operations, a plurality of data objects 118 are used. The data objects 118 may be business objects, or any other suitable object type. In one example, each business object may be an entity that works in conjunction with data access and business logic layers to transport and manage data. In the illustrated example, the backend system 102 can store and access data based on a data object 118, e.g., a business object. Example business objects can include a Sales Order object, a Customer object, a Supplier object, an Address object, and the like. In some examples, each business object defines a data structure including one or more attributes of the respective object, a data value being provided for each attribute. In some examples, each business object includes a primary key. For example, metadata of the business object can identify a particular attribute as the primary key for the particular object. In some examples, data for the business object is stored in one or more database tables. For example, when a business object is accessed, data can be retrieved from a database table (table) to populate the business object.

The attributes of a particular data object 118 may be associated with particular fields 120, such that only particular values are allowed to be used in a particular field 120. The particular values may be associated with both a code value and a corresponding code description, where the code description represents a particular descriptive string identifying the meaning of a particular code value. Each field may define or be associated with a field information list 122 which includes a set of potential current value pairs 124 supported for use within the particular field 120. The current value pairs 124 can include a specific code value 126 (e.g., a number or numerical string value such as "0", "001", or any suitable value) and a corresponding code description 128. As noted above, the particular current pairs 124 of available or possible values for a particular field 120 and/or data object 118 may change over time. Because of this, client applications 176 and web services 150 attempting to interact with the backend system 102 and specific data objects 118 may not be able to hard code specific code values and descriptions into their code. Alternatively, if changes are made to the client application 176 and/or the web services 150 in every instance that a particular data object 118 is modified, significant downtime and maintenance time may be required.

As illustrated, example backend system 102 includes interface 104, processor 106, input analyzer 108, the backend functionality 114, and memory 116. The interface 104 is used by the backend system 102 for communicating with other systems in a distributed environment—including within the environment 100—connected to the network 140, e.g., the web service 150, client 170, other backend systems 102, as well as other systems communicably coupled to the illustrated backend system 102 and/or network 140. Generally, the interface 104 comprises logic encoded in software and/or hardware in a suitable combination and operable to communicate with the network 140 and other components. More specifically, the interface 104 may comprise software supporting one or more communication protocols associated with communications such that the network 140 and/or interface's hardware is operable to communicate physical signals within and outside of the illustrated environment 100. Still further, the interface 104 may allow the backend system 102 to communicate with the web services 150 and/or client 170 in response to specific requests related to the backend functionality 114 and/or particular data objects 118, as described in the present disclosure.

Network 140 facilitates wireless or wireline communications between the components of the environment 100 (e.g., between the backend system 102 and the web service 150), as well as with any other local or remote computer, such as additional mobile devices, clients (e.g., client 170), servers, or other devices communicably coupled to network 140, including those not illustrated in FIG. 1. In the illustrated environment, the network 140 is depicted as a single network, but may be comprised of more than one network without departing from the scope of this disclosure, so long as at least a portion of the network 140 may facilitate communications between senders and recipients. In some instances, one or more of the illustrated components (e.g., the backend system 102 and the web service 150) may be included within network 140 as one or more cloud-based services or operations. The network 140 may be all or a portion of an enterprise or secured network, while in another instance, at least a portion of the network 140 may represent a connection to the Internet. In some instances, a portion of the network 140 may be a virtual private network (VPN). Further, all or a portion of the network 140 can comprise either a wireline or wireless link. Example wireless links may include 802.11a/b/g/n/ac, 802.20, WiMax, LTE, and/or any other appropriate wireless link. In other words, the network 140 encompasses any internal or external network, networks, sub-network, or combination thereof operable to facilitate communications between various computing components inside and outside the illustrated environment 100. The network 140 may communicate, for example, Internet Protocol (IP) packets, Frame Relay frames, Asynchronous Transfer Mode (ATM) cells, voice, video, data, and other suitable information between network addresses. The network 140 may also include one or more local area networks (LANs), radio access networks (RANs), metropolitan area networks (MANs), wide area networks (WANs), all or a portion of the Internet, and/or any other communication system or systems at one or more locations.

The backend system 102 also includes one or more processors 106. Although illustrated as multiple processors 106 in FIG. 1, a single processor may be used according to particular needs, desires, or particular implementations of the environment 100. Each processor 106 may be a central processing unit (CPU), an application specific integrated circuit (ASIC), a field-programmable gate array (FPGA), or another suitable component. Generally, the processor 106 executes instructions and manipulates data to perform the operations of the backend system 102, in particular those related to the backend functionality 114 and the input analyzer module 108. Specifically, the processor(s) 106 executes the algorithms and operations described in the illustrated figures, as well as the various software modules and functionality, including the functionality for sending communications to and receiving transmissions from clients 170 and web services 150, as well as to other devices and systems. Each processor 106 may have a single or multiple core, with each core available to host and execute an individual processing thread.

Regardless of the particular implementation, "software" includes computer-readable instructions, firmware, wired and/or programmed hardware, or any combination thereof on a tangible medium (transitory or non-transitory, as appropriate) operable when executed to perform at least the processes and operations described herein. In fact, each software component may be fully or partially written or described in any appropriate computer language including C, C++, JavaScript, Java™, Visual Basic, assembler, Perl®, any suitable version of 4GL, as well as others.

Turning to the input analyzer 108, operations are provided when executed by the processor 106 to provide information about a particular data object 118 or data object field 120 in response to requests from a particular web service 150 or client application 176 attempting to obtain and validate information associated with a particular data object 118. The input analyzer module 108 can communicate with particular web services 150 via the web service API 110, which may also be realized as any endpoint or communications link or interface making the input analyzer module 108 available. In some instances, the input analyzer module 108 may be included within or inherent to the backend functionality 114, while in other instances the input analyzer module 108 may be separate from the backend functionality. In some instances, the input analyzer module 108 may be separate or remote from the backend system 102, including as a consumable web service itself available to other web services 150 or to the client application 176.

The input analysis module 112 of the input analyzer 108 can be used to receive free text input submitted via the client application 176 (e.g., and received at the backend system 102 via the web service 150). The free text input may be a string of input associated with a particular data object 118, and in particular a certain field 120 of the particular data object 118. In some instances, the text input may be associated with a particular data type and/or a particular field 120 based on programming or a connection associated with either the client application 176 or the web service 150 associated with the action. In any instance, the input analysis module 112 can identify the particular data type or field 120 associated with the submitted request. In some instances, the submitted request may be query associated with a particular data object 118, a requested action to be performed at the backend system 102 associated with a particular data object 118, or any other suitable communication or interaction. The input analysis module 112 works to associate the received text input to a particular code value as used in the data object 118 and in conjunction with the backend functionality 114 associated with the received request. The code value that is associated with the request must match the available code values 126 from a valid pair 124 within the data object 118, or the action cannot be performed as the input cannot be validated. The input analysis module 112 provides the ability to generically connect the received input to the potential pairs 124 for the field 120, or determine that no match is available.

Initially, the input analysis module 112 identifies the particular data type or field associated with the input. The input analysis module 112 then accesses the data object 118 and its field information list 122 (or other suitable listing or repository) to obtain a list of current code values and code description pairs 124 corresponding to the particular data type or field. Once the list is obtained, the input analysis module 112 can compare the received input to the code descriptions 128 included among the pairs 124 to determine whether a match is included within the obtained list. Any suitable comparison or analysis may be used, including a regular expression, a description-by-description comparison, or a fuzzy logic analysis. The analysis process can include using the complete input or a portion of the input (e.g., a first set of characters included in the text string) and comparing that input to the one or more code descriptions 128 available for the associated field 120. In some instances, an exact match may be identified where the text input exactly matches a particular code description 128. In those instances, the input can then be associated with the code value 126 paired with the identified code description 128. At that point, the operation associated with the request can be processed or otherwise continued using the now-associated code value 126 determined in the match.

In some instances, two or more code descriptions 128 may be similar to or partially matching the text input. In those instances, several options are available. In one instance, a best match may be used for determining which pair 124 matches the input, particularly where the likelihood of match is high (e.g., based on any suitable algorithm or determination). Alternatively, the input analysis module 122 may provide a set of contextual help back to the web service 150 and the client application 176, where the contextual help provides a listing to the user identifying the potential matches from the current pairs 124. In particular, the available code descriptions 128 at least partially matching the input can be provided back. In some instances, the user may need to resubmit text corresponding to the potential matching code descriptions 128, while in others the potentially matching code descriptions 128 may be presented in an interactive and/or selectable manner, such as in a selectable dropdown list presented at a GUI 180 associated with the client application 176. Using any suitable responsive technique, including click-based selection, voice-activated selection, touch-based selection, or any other suitable manner, an updated input associated with the selection of the particular code description 128 intended is received at the client 170 and provided back to the input analysis module 112. The input is then associated with the code value 126 corresponding to the selected code description 128, and any corresponding actions to be performed by the backend system 102 in response to the request and the selection are performed.

In some instances, no particular match may be identified, in part or in whole. In those instances, the input analysis module 112 may return an error or provide contextual help similar to the partial match. In these instances, the available pairs 124 may be obtained by the input analysis module 112 and then provided to the user for review. In response to a particular selection, the input can be associated with the corresponding code value 126 associated with the selected code description 128 and used for the operations associated with the initial request.

Memory 116 of the backend system 102 may represent a single memory or multiple memories. The memory 116 may include any memory or database module and may take the form of volatile or non-volatile memory including, without limitation, magnetic media, optical media, random access memory (RAM), read-only memory (ROM), removable media, or any other suitable local or remote memory component. The memory 116 may store various objects or data (e.g., data objects 118, as well as others, etc.), including financial data, user information, administrative settings, password information, caches, applications, backup data, repositories storing business and/or dynamic information, and any other appropriate information associated with the backend system 102 including any parameters, variables, algorithms, instructions, rules, constraints, or references thereto. Additionally, the memory 116 may store any other appropriate data, such as VPN applications, firmware logs and policies, firewall policies, a security or access log, print or other reporting files, as well as others. While illustrated within the backend system 102, memory 116 may be located remote from the backend system 102 in some instances, including as a cloud application or repository, or as a separate cloud application or repository when the backend system 102 itself is a cloud-based system.

Web service 150 may be any consumable web service or application capable of interacting with the input analyzer 108 to interact with the backend system 102 and, in particular, the input analyzer 108. The web service 150 may be called by a client application 176 attempting to access or interact with the backend system 102, and can be used to perform or request information from the backend system 102 by the client application 176 or any other suitable component. In some instances, a plurality of web services 150 may be associated with or available to the backend system 102. Each web service 150 may be able to receive a particular request including a text string associated with a particular data object 118 and its fields 120. In some instances, different web services 150 may be specifically linked to a particular data object 118 or to a particular field 120 within a particular data object 118.

In some instances, input received from the client application 176 may provide or identify a particular data object 118 or field 120 associated with a request, such that the web service 150 can identify that particular data object 118 or field 120 when forwarding or interpreting the request to be sent to the backend system 102. Further, in some instances, additional contextual information may be identified by or provided to the web service 150. For example, information about a user associated with the request may be determined at the web service 150 or included in the request provided by the client application 176. Such information may include information on the user's role, current location, or other information, which can further condense or reduce the amount of potential pairs 124 that may be associated with the user. In other instances, at least one other selection made within the client application 176 may be used to otherwise provide context to the input analysis. For example, if a user has selected or is associated with a particular country in the client application 176 or in the backend system 102, and the text input relates to a "State" field, the respective states of the particular country may be available as opposed to states from another country. In such instances, the context of the request may be included in the operations performed by the input analyzer 108 and limit or otherwise filter the available pairs 124 returned as possible matches or options.

As illustrated, the web service 150 may include specific functionality or modules to handle the text input (i.e., the text input handler 154), as well as to responsively interact with the client application 176 or other calling component (i.e., the responsive output handler 158). The text input handler 154 can perform operations associated with formatting the received request appropriately for the input analyzer 108 to perform its operations. The responsive output handler 158 can format responsive communications or feedback generated by the input analyzer 108, such as error messages, contextual help information, or any other suitable output. The output handler 158 can interact with the client application 176 to provide that feedback or output to the client application 176.

While described specifically as a web service, web service 150 can be any suitable component able to interact with the input analyzer 108 and provide input from the client application 176 to the backend system 102 in an effort to generically determine the corresponding fields 120 associated with a request or operation. Similarly, the input analyzer 108 functionality may be included within the web service 150 or within the client application 176 in some instances.

Web service 150 also includes interface 152, which may be similar to or different than interface 104. In general, interface 152 allows the web service 150 to interact with client 170, backend system 102, or any other suitable components communicably coupled to network 140.

As illustrated, one or more clients 170 may be present in the example system 100. Each client 170 may be associated with requests transmitted to the backend system 102 related to the backend functionality 114 and/or one or more data objects 118 and which request data or the performance of actions associated with those data objects 118. As illustrated, the client 170 may include an interface 172 for communication (similar to or different from interface 104), a processor 174 (similar to or different from processor 106), a client application 176, memory 182 (similar to or different from memory 116), and a graphical user interface (GUI) 180.

The illustrated client 170 is intended to encompass any computing device such as a desktop computer, laptop/notebook computer, mobile device, smartphone, personal data assistant (PDA), tablet computing device, one or more processors within these devices, or any other suitable processing device. In general, the client 170 and its components may be adapted to execute any operating system, including Linux, UNIX, Windows, Mac OS®, Java™, Android™, or iOS. In some instances, the client 170 may comprise a computer that includes an input device, such as a keypad, touch screen, or other device(s) that can interact with the client application 176, and an output device that conveys information associated with the operation of the applications and their application windows to the user of the client 170. Such information may include digital data, visual information, or a GUI 180, as shown with respect to the client 170. Specifically, the client 170 may be any computing device operable to communicate queries or communications to the backend system 102, web service 150, other clients 170, and/or other components via network 140, as well as with the network 140 itself, using a wireline or wireless connection. In general, client 170 comprises an electronic computer device operable to receive, transmit, process, and store any appropriate data associated with the environment 100 of FIG. 1.

Client application 176 may be any suitable application, program, mobile app, or other component. As illustrated, the client application 176 interacts with the backend system 102 via the web service 150 and network 140. In some instances, the client application 176 may be a browser, where the functionality of the client application 176 may be realized using a web application or website the user can interact with via the client application 176. In other instances, the client application 176 may be a remote agent, component, or client-side version of the backend system 102. In some instances, the client application 176 may interact directly with the backend system 102, where the web service's functionality is included within the client application 176, another client-side component, or at the backend system 102. As illustrated, at least part of the client application 176 may accept free text input 178 associated with a particular data object 118, and particularly, regarding one or more fields 120 of the particular data object 118. In the illustrated instance, the free text input 178 can be provided to the backend system 102 via the web service 150, where the web service 150 formats the input using the text input handler 154 as described.

GUI 180 of the client 170 interfaces with at least a portion of the environment 100 for any suitable purpose, including generating a visual representation of the client application 176 and/or the content associated with the client application 176. In particular, the GUI 180 may be used to present results of queries associated with one or more data objects 118. GUI 180 may also be used to view and interact with various Web pages, applications, and Web services located local or external to the client 170. Generally, the GUI 180 provides the user with an efficient and user-friendly presentation of data provided by or communicated within the system. The GUI 180 may comprise a plurality of customizable frames or views having interactive fields, pull-down lists, and buttons operated by the user. For example, the GUI 180 may provide interactive elements that allow a user to view or interact with information related to the operations of processes associated with the backend system 102, including the presentation of and interaction with particular data objects 118 and the backend functionality 114 of the backend system 102. In general, the GUI 180 is often configurable, supports a combination of tables and graphs (bar, line, pie, status dials, etc.), and is able to build real-time portals, application windows, and presentations. Therefore, the GUI 180 contemplates any suitable graphical user interface, such as a combination of a generic web browser, a web-enable application, intelligent engine, and command line interface (CLI) that processes information in the platform and efficiently presents the results to the user visually.

While portions of the elements illustrated in FIG. 1 are shown as individual modules that implement the various features and functionality through various objects, methods, or other processes, the software may instead include a number of sub-modules, third-party services, components, libraries, and such, as appropriate. Conversely, the features and functionality of various components can be combined into single components as appropriate.

Figure 2:
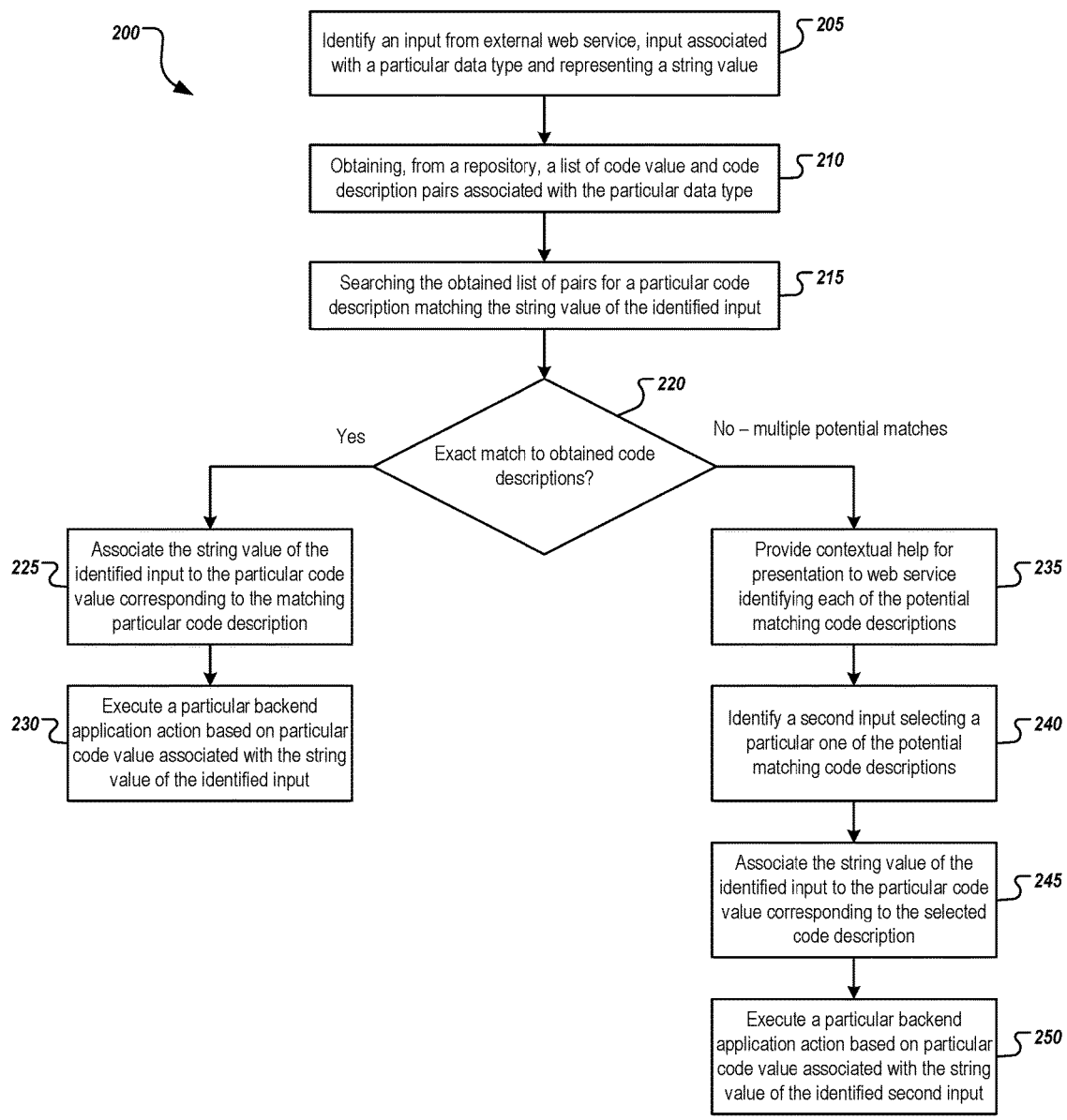
FIG. 2 represents an example flow for associating input received from an external web service to a particular field or input of a corresponding data object within a backend system.

FIG. 2 represents an example flow for associating input received from an external web service to a particular field or input of a corresponding data object within a backend system. For clarity of presentation, the description that follows generally describes method 200 in the context of the system 100 illustrated in FIG. 1. However, it will be understood that method 200 may be performed, for example, by any other suitable system, environment, software, and hardware, or a combination of systems, environments, software, and hardware as appropriate. While described as receiving the input from an external web service, the input may be received from any suitable component, including directly from a client application (e.g., client application 176), a web application, or another component.

At 205, an input from an external web service is identified. The input can represent a text string received as input, such as from a website, a web application, or any suitable component, including a cloud-based software system or platform. The input can be associated with a particular data type, or can identify a particular data object or field with which the input is associated. In some instances, the external web service may be used to determine the field associated with the input, or the input may include additional explicit or implicit information identifying the field or data object associated therewith, or usable to derive the field or data object.

At 210, a list of code values and code description pairs associated with the particular data type or associated data object field can be obtained. The list may be obtained via the backend system associated with the data object, by querying the data object for available or acceptable pairs associated with the field, or by any other suitable method, including by accessing a metadata repository or field information database or chart. The list of code values and code descriptions can provide a pair representing (1) a particular code value used by a backend system to execute operations associated with the data object for that field (e.g., a numeric value, a string holding a particular numeric string, etc.) and (2) a code description used to identify the semantic meaning or explanation of a particular corresponding code value. In some instances, the received input may be associated with a predefined context that shapes or modifies the list of pairs returned at 210. For example, a prior selection may determine a subset of the overall set of pairs that may be returned. For example, a particular field may represent a location, such as a state, to be assigned to a new instance of a data object. If a country has been previously selected by the user during prior inputs, or if the user is associated with a particular country based on role, company, or personal restrictions, among others, then the potential pairs may be limited to the states of the particular country associated with the user. In one example instance, the country may be determined to be the United States. While states or territories of various nations may be usually available for using in the field, the current solution may limit those possible pairs obtained at 210 to those corresponding to the United States. In doing so, code descriptions that would otherwise possibly match an input but that would not match the context can be discarded or ignored. In some instances, that context may be provided based on information associated with or known about the user submitting the request, may be associated with or derived from the requesting application or web service, may be based on a prior submitted indication or a particular context within the requesting application, or based on any other suitable contextual information.

At 215, the obtained list of code value and code description pairs are searched to identify a code description matching the value of the identified input. In some instances, the search may be based on fuzzy logic, may use a regular expression, may find a closest match or set of matches within the obtained list, or may perform the search in any other suitable manner.

At 220, a determination is made as to whether an exact match to a particular code description is returned. In some instances, one exact match may be determined based on the input and search, where method 200 continues at 225. In others, multiple potential matches may be identified, where method 200 continues at 235. In still others, no matches may be returned or identified as potential matches, such that an error message can be returned to the user (not shown).

Where a single exact match is identified, or where only one possible code description is similar to the identified input, method 200, at 225, can associate the string value of the identified input to the particular code value corresponding to identified code description from the list of pairs that matches the input. In doing so, the backend system can apply the code value associated with the matching code description to the identified input. Once that is complete, at 230, a particular backend application action associated with the input and based on the particular code value associated with the input can be executed. In some instances, responsive feedback or content may be provided back to the user or client application in response to the completed action.

Where multiple potential matches are identified based on the input, or where no particular code description can be confidently associated with or matched to a single code description, method 200 continues at 235. At 235, a set of contextual help information can be provided for presentation to the user (e.g., via the external web service, another web service, or through an alternative communication channel or presentation). The contextual help information can provide an identification of the code descriptions of the potential matches, where two or more code descriptions represent potential matches. In some instances, providing the contextual help for presentation may allow the user to submit or select a particular one of potential matches provided in the contextual help, such as by a selectable or interactive presentation within a client application or interface associated with requests. In some instances, where no potential matches were found at 220, the entire set of possible code descriptions associated with the field or data type may be provided within the set of contextual help.

At 240, a second input selecting a particular one of the potential matching code descriptions included in the set of contextual help can be identified. At 245, the identified input can then be associated with the code description selected as the second input, and the corresponding code value to the selected code description can be associated with the input and requested operation. At 250, similar to 230, a particular backend application action associated with the initial input and the selected second input can be executed using the corresponding code value now associated with the requested action. In some instances, responsive feedback or content may be provided back to the user or client application in response to the completed or executed action.

As noted, one benefit of the present solution is that developers may no longer be required to manually update listings of particular fields and code descriptions in their applications when backend systems are also updated. Instead, the present solution allows the list of pairs to be updated on the backend system without requiring changes to the potential inputs at the client, while still allowing users to access each of the available field values and descriptions during interactions with the data object.

FIG. 3 is an example illustration of several potential pseudocode-based operations performed in one implementation of the present disclosure. The code shown here is used merely as an illustrative example. Any suitable coding or language can be used in other implementations to achieve similar results and functionality.

As illustrated by 305, pseudocode for obtaining the available supported code values and code descriptions for a particular field is used for a field of "CountryCode." The variable "allCountryValAndDesc" can be populated with the list of all possible code values and code descriptions for the particular field.

As illustrated by 310, a context-dependent set of values may be found that limit the resulting list of code values and code descriptions based on an additional context or contextual information associated with the request. Here, the variable "allRegionValAndDescr" can be populated with the code values and code descriptions of a particular region of countries based on the identified context. By allowing the contextual filtering of the country codes within a particular region, potential matches that do not correspond to the countries desired by or relevant to the requesting user can be ignored or discarded.

As illustrated by 315, a variable "match" can be created that is used to perform the matching process to the received input against the set of country code values and code descriptions obtained by 305. If a single match is available, then the result of the operation and the value of "match" can return the verified and supported value and description of the code pair mapped via the process. That code value can then be applied to any backend operations and functionality, including those associated with the input received from the user or computer system.

In some instances, as described above, no specific match may be found. In those instances, some or all of the potential code values and code descriptions may be returned to the user. The code in 320 illustrates a loop over all code values and code descriptions, where the corresponding code and description can be stored for each possible value pair. This information, or at least a portion thereof, can be provided back to the user associated with the request to allow for a matching code description to be selected.

The illustration of 325 illustrates how languages may be changed from an external data source language to an internal data source language. In other words, the request from, e.g., the external web service may be in a first language while the code descriptions in the backend system are stored in a second language different than the first language. In such instances, the code provides a means to convert the values and descriptions into the second language, or to obtain a language-specific listing of the pairs to allow the first language to be matched to the second language.

The preceding figures and accompanying description illustrate example processes and computer implementable techniques. But environment 100 (or its software or other components) contemplates using, implementing, or executing any suitable technique for performing these and other tasks. It will be understood that these processes are for illustration purposes only and that the described or similar techniques may be performed at any appropriate time, including concurrently, individually, or in combination. In addition, many of the steps in these processes may take place simultaneously, concurrently, and/or in different orders than as shown. Moreover, environment 100 may use processes with additional steps, fewer steps, and/or different steps, so long as the methods remain appropriate.

One example alternative is the usage of similar techniques for XML file uploads and/or migration workbenches where the ability to import unknown or unverified data may be provided. In such instances, the techniques described herein can be used to receive string or text input associated with any suitable input mechanisms and compare that input to a known or expected list of potential code value and code description pairs.

In other words, although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. A method comprising:
    identifying, at a backend application, an input received from an external web service associated with a particular data type, the input representing a string value corresponding to a user input entry provided during consumption of the external web service, the external web service calling a remote action associated with the backend application;
    obtaining, from a repository, a list of code value and code description pairs associated with the particular data type;
    searching the obtained list of code values and code description pairs for a particular code description matching the string value of the identified input;
    in response to identifying a particular code description from the obtained list of code value and code description pairs exactly matching the string value of the identified input:
        associating the string value of the identified input to the particular code value corresponding to the particular code description;
        executing a particular backend application action based on the particular code value associated with the string value of the identified input; and
    in response to identifying two or more code descriptions from the obtained list of code values and code description pairs partially matching the string value of the identified input:
        providing contextual help for presentation to the external web service, the contextual help identifying each of the code descriptions associated with the two of more code descriptions from the obtained list of code value and code description pairs;
        identifying a second input received from the external web service associated with a particular one of the two or more code descriptions; and
        associating the string value of the identified input to the particular code value corresponding to the particular one of the two or more code descriptions.

2. The method of claim 1, wherein searching the obtained list of code values and code description pairs for the particular code description matching the string value of the identified input comprises executing a regular expression to identify at least one code description from the obtained list of code value and code description pairs matching the identified input.

3. The method of claim 1, wherein the input received from the external web service comprises user input entered into a text box, and wherein the text box is associated with a particular data type.

4. The method of claim 1, wherein the input received from the external web service is associated with a predefined context, wherein the predefined context is used to identify a subset of the list of code value and code description pairs associated with the particular data type, and wherein obtaining the list of code value and code description pairs associated with the particular data type comprises obtaining a list of code value and code description pairs associated with the particular data type and corresponding to the predefined context.

5. The method of claim 1, wherein the list of code value and code description pairs associated with the particular data type is extended from an initially defined list to include at least one code value and code description pair not available at a time the external web service was created.

6. The method of claim 1, wherein the list of code value and code description pairs are associated with a set of allowed inputs associated with the backend application, wherein changes to the set of allowed inputs associated with the backend application are not provided to the external web service.

7. The method of claim 1, wherein each code description comprises a natural language description of the input represented by the corresponding code value.

8. The method of claim 1, wherein the code value and code description pairs are associated with business object data.

9. A system comprising:
    at least one processor; and
    a memory communicatively coupled to the at least one processor, the memory storing instructions which, when executed, cause the at least one processor to perform operations comprising:
        identifying, at a backend application, an input received from an external web service associated with a particular data type, the input representing a string value corresponding to a user input entry provided during consumption of the external web service, the external web service calling a remote action associated with the backend application;
        obtaining, from a repository, a list of code value and code description pairs associated with the particular data type;
        searching the obtained list of code values and code description pairs for a particular code description matching the string value of the identified input;
        in response to identifying a particular code description from the obtained list of code value and code description pairs exactly matching the string value of the identified input:
            associating the string value of the identified input to the particular code value corresponding to the particular code description;
            executing a particular backend application action based on the particular code value associated with the string value of the identified input; and
        in response to identifying two or more code descriptions from the obtained list of code values and code description pairs partially matching the string value of the identified input:
            providing contextual help for presentation to the external web service, the contextual help identifying each of the code descriptions associated with the two of more code descriptions from the obtained list of code value and code description pairs;
            identifying a second input received from the external web service associated with a particular one of the two or more code descriptions; and associating the string value of the identified input to the particular code value corresponding to the particular one of the two or more code descriptions.

10. The system of claim 9, wherein searching the obtained list of code values and code description pairs for the particular code description matching the string value of the identified input comprises executing a regular expression to identify at least one code description from the obtained list of code value and code description pairs matching the identified input.

11. The system of claim 9, wherein the input received from the external web service comprises user input entered into a text box, and wherein the text box is associated with a particular data type.

12. The system of 9, wherein the input received from the external web service is associated with a predefined context, wherein the predefined context is used to identify a subset of the list of code value and code description pairs associated with the particular data type, and wherein obtaining the list of code value and code description pairs associated with the particular data type comprises obtaining a list of code value and code description pairs associated with the particular data type and corresponding to the predefined context.

13. The system of claim 9, wherein the list of code value and code description pairs associated with the particular data type is extended from an initially defined list to include at least one code value and code description pair not available at a time the external web service was created.

14. The system of claim 9, wherein the list of code value and code description pairs are associated with a set of allowed inputs associated with the backend application, wherein changes to the set of allowed inputs associated with the backend application are not provided to the external web service.

15. The system of claim 9, wherein each code description comprises a natural language description of the input represented by the corresponding code value.

16. The system of claim 9, wherein the code value and code description pairs are associated with business object data.

17. A non-transitory computer-readable medium storing instructions which, when executed, cause at least one processor to perform operations comprising:
Identifying, at a backend application, an input received from an external web service associated with a particular data type, the input representing a string value corresponding to a user input entry provided during consumption of the external web service, the external web service calling a remote action associated with the backend application;
obtaining, from a repository, a list of code value and code description pairs associated with the particular data type;
searching the obtained list of code values and code description pairs for a particular code description matching the string value of the identified input;
in response to identifying a particular code description from the obtained list of code value and code description pairs exactly matching the string value of the identified input:
associating the string value of the identified input to the particular code value corresponding to the particular code description;
executing a particular backend application action based on the particular code value associated with the string value of the identified input; and
in response to identifying two or more code descriptions from the obtained list of code values and code description pairs partially matching the string value of the identified input:
providing contextual help for presentation to the external web service, the contextual help identifying each of the code descriptions associated with the two of more code descriptions from the obtained list of code value and code description pairs;
identifying a second input received from the external web service associated with a particular one of the two or more code descriptions; and
associating the string value of the identified input to the particular code value corresponding to the particular one of the two or more code descriptions.

* * * * *